United States Patent
Prince et al.

(10) Patent No.: US 11,236,261 B2
(45) Date of Patent: Feb. 1, 2022

(54) POLYAROMATIC HYDROCARBON ADDITIVES FOR HYDRATE INHIBITION

(71) Applicants: Multi-Chem Group, LLC, Houston, TX (US); UCL Business PLC, London (GB)

(72) Inventors: Philippe Prince, Pearland, TX (US); Loan Vo, Houston, TX (US); Deepak S. Monteiro, Houston, TX (US); Tai Duc Bui, London (GB); Alberto Striolo, London (GB)

(73) Assignee: Halliburton Energy Services, Inc., Houston, TX (US)

( * ) Notice: Subject to any disclaimer, the term of this patent is extended or adjusted under 35 U.S.C. 154(b) by 175 days.

(21) Appl. No.: 16/549,399

(22) Filed: Aug. 23, 2019

(65) Prior Publication Data

US 2020/0087566 A1    Mar. 19, 2020

Related U.S. Application Data

(60) Provisional application No. 62/731,479, filed on Sep. 14, 2018.

(51) Int. Cl.
*C09K 8/52* (2006.01)
*E21B 37/06* (2006.01)

(52) U.S. Cl.
CPC ............... *C09K 8/52* (2013.01); *E21B 37/06* (2013.01); *C09K 2208/22* (2013.01)

(58) Field of Classification Search
None
See application file for complete search history.

(56) References Cited

U.S. PATENT DOCUMENTS

| 5,648,575 A | 7/1997 | Klomp et al. |
|---|---|---|
| 7,381,689 B2 | 6/2008 | Panchalingam et al. |
| 8,034,748 B2 * | 10/2011 | Dahlmann ............ C07C 219/06 507/90 |
| 8,329,620 B2 | 12/2012 | Acosta |
| 8,618,025 B2 * | 12/2013 | Webber ................ C07C 229/16 507/240 |
| 2005/0081432 A1 * | 4/2005 | Panchalingam ........ C10L 3/003 44/419 |
| 2016/0098615 A1 | 4/2016 | Perez et al. |

(Continued)

FOREIGN PATENT DOCUMENTS

| WO | 2015/041679 A1 | 3/2015 |
|---|---|---|
| WO | 2017/165754 A1 | 9/2017 |

OTHER PUBLICATIONS

International Search Report and Written Opinion issued in related PCT Application No. PCT/US2019/050971 dated Dec. 27, 2019, 13 pages.

*Primary Examiner* — John J Figueroa
(74) *Attorney, Agent, or Firm* — Tenley Krueger; Baker Botts L.L.P.

(57) ABSTRACT

Methods involving anti-agglomerant hydrate inhibitors and polyaromatic hydrocarbons for hydrate inhibition are provided. In some embodiments, the methods include introducing a hydrate inhibitor composition including an anti-agglomerant hydrate inhibitor into a fluid including (i) water and (ii) one of gas, liquid hydrocarbon, and any combination thereof; and introducing a polyaromatic hydrocarbon into the fluid.

20 Claims, 1 Drawing Sheet

(56) References Cited

U.S. PATENT DOCUMENTS

| | | |
|---|---|---|
| 2016/0102240 A1 | 4/2016 | Zhao et al. |
| 2018/0016484 A1 | 1/2018 | Ray et al. |
| 2018/0320050 A1 | 11/2018 | AlBahrani et al. |
| 2020/0216742 A1* | 7/2020 | Mohammed ............. C09K 8/36 |

* cited by examiner

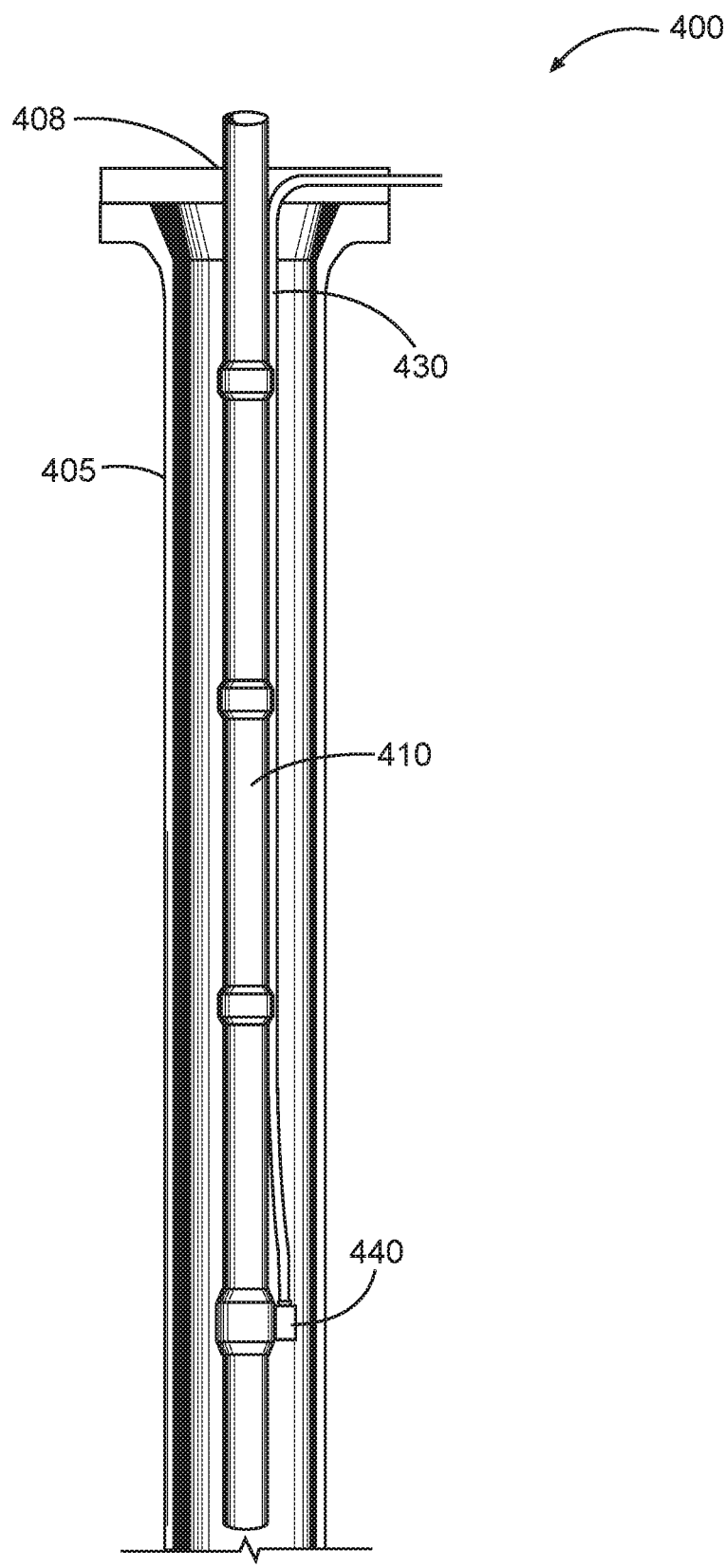

POLYAROMATIC HYDROCARBON ADDITIVES FOR HYDRATE INHIBITION

CROSS-REFERENCE TO RELATED APPLICATION

The present application claims priority to U.S. Provisional Application Ser. No. 62/731,479 filed on Sep. 14, 2018, entitled "ADDITIVE FOR HYDRATE INHIBITION" which is herein incorporated by reference in its entirety.

BACKGROUND

The present disclosure relates to compositions and methods useful in processes involving fluid flowing through, or contained in, vessels or conduits, such as pipes used, e.g., for the production and/or transport of petroleum products, natural gas, and the like. More particularly, the present disclosure relates to compositions and the use of such compositions, such as in the inhibition of the formation of gas hydrate agglomerates.

Gas hydrates are solids that may agglomerate in a fluid that is flowing or is substantially stationary, under certain temperature and pressure conditions. For example, gas hydrates may form during hydrocarbon production from a subterranean formation, in particular in pipelines and other equipment during production operations. Hydrates may impede or completely block flow of hydrocarbons or other fluid flowing through such pipelines. These blockages not only may decrease or stop production, potentially costing millions of dollars in lost production, but also may be very difficult and dangerous to mediate. Unless properly handled, gas hydrates may be volatile and/or explosive, potentially rupturing pipelines, damaging equipment, endangering workers, and/or causing environmental harm.

Gas hydrates may form when water molecules become bonded together after coming into contact with certain "guest" gas or liquid molecules. Hydrogen bonding may cause the water molecules to form a regular lattice structure, like a cage, that is stabilized by the guest gas or liquid molecules entrapped within the lattice structure. The resulting crystalline structure may precipitate as a solid gas hydrate. Guest molecules can include any number of molecules such as, for example, carbon dioxide, methane, ethane, propane, butane, hydrogen sulfide, nitrogen, oxygen, and the like.

BRIEF DESCRIPTION OF THE DRAWINGS

These drawings illustrate certain aspects of some of the embodiments of the present disclosure and should not be used to limit or define the claims.

FIG. 1 is a diagram illustrating an injection system used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure involving wellbores may be applicable to horizontal, vertical, deviated, or otherwise nonlinear wellbores in any type of subterranean formation. Embodiments may be applicable to injection wells, monitoring wells, and production wells, including hydrocarbon or geothermal wells.

The present disclosure relates to systems and methods for use in subterranean formations. Particularly, the present disclosure relates to systems and methods for the use of hydrate inhibitors and polyaromatic hydrocarbons for hydrate inhibition.

As used herein, a "hydrocarbon chain" may, unless otherwise specifically noted, be substituted or unsubstituted (that is, it may or may not contain one or more additional moieties or functional groups in place of one or more hydrogens in the hydrocarbon chain); it may be branched, unbranched, acyclic, and/or cyclic; and/or it may be saturated or unsaturated. Furthermore, as used herein, the nomenclature "$C_x$ to $C_y$," refers to the number of carbon atoms in the hydrocarbon chain (here, ranging from x to y carbon atoms).

In certain embodiments, the present disclosure relates to a method including introducing a hydrate inhibitor composition including an anti-agglomerant hydrate inhibitor into a fluid including (i) water and (ii) one of gas, liquid hydrocarbon, and any combination thereof and introducing a polyaromatic hydrocarbon into the fluid. Although listed separately from liquid hydrocarbon, the gas may in some embodiments include gaseous hydrocarbon, though the gas need not necessarily include hydrocarbon. In some embodiments, the gas may include, but is not limited to $O_2$, $H_2$, $N_2$, $CO_2$, $CH_4$, $H_2S$, Ar, Kr, Xe, a hydrocarbon, a freon, and any combination thereof. In some embodiments, the methods of the present disclosure include forming a hydrate inhibitor composition by mixing an anti-agglomerant hydrate inhibitor with a polyaromatic hydrocarbon, wherein the ratio of the concentrations of the polyaromatic hydrocarbon to anti-agglomerant hydrate inhibitor is from about 2:1 to about 10:1 by volume; and injecting the hydrate inhibitor composition into a vessel, conduit (e.g., an umbilical, capillary, or tubing), well bore, and/or a portion of a subterranean formation. In certain embodiments, the methods of the present disclosure include introducing a hydrate inhibitor composition including an anti-agglomerant hydrate inhibitor into a portion (e.g., a wellhead) of a wellbore penetrating at least a portion of a subterranean formation; and introducing a polyaromatic hydrocarbon into the wellhead.

Among the many potential advantages to the methods and compositions of the present disclosure, only some of which are alluded to herein, the methods, compositions, and systems of the present disclosure may provide improved anti-agglomerant performance due to the presence of polyaromatic hydrocarbons. For example, hydrate agglomeration may be inhibited to a greater degree than that using conventional means (i.e., hydrate inhibitors without the addition of polyaromatic hydrocarbons).

The hydrate inhibitor compositions of the present disclosure may include an anti-agglomerant hydrate inhibitor. In certain embodiments, the anti-agglomerant hydrate inhibitor may include a cationic surfactant. In some embodiments, the anti-agglomerant hydrate inhibitor may include a compound including a quaternary ammonium moiety. A quaternary ammonium moiety according to some embodiments may include the general structure $R^xR^yR^zM^+$-, where each R-group $R^x$, $R^y$, and $R^z$ may be any suitable moiety that maintains the hydrophilic nature of the quaternary ammonium moiety to which each of $R^x$, $R^y$, and $R^z$ is attached, and M may be nitrogen or phosphorus.

In some embodiments, the anti-agglomerant hydrate inhibitor may include a two-tailed cationic surfactant. In certain embodiments, the cationic surfactant may include at least one hydrophilic head and at least one lipophilic tail. In some embodiments, for example, the cationic surfactant may include one hydrophilic head and one lipophilic tail, one hydrophilic head and two lipophilic tails, two hydrophilic heads and one lipophilic tail, or two hydrophilic heads and two hydrophilic tails.

A two-tailed cationic surfactant may include a cationic surfactant having two $C_5$ to $C_{22}$ hydrocarbon chains. Examples of two-tailed cationic surfactants suitable for certain embodiments of the present disclosure include compounds having the structural formula:

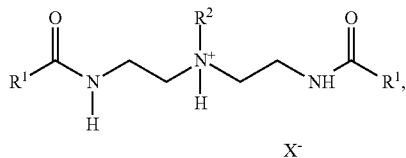

In certain embodiments, $R^1$ may include a $C_5$-$C_{22}$ hydrocarbon chain, $R^2$ may include a $C_1$-$C_6$ hydrocarbon chain, and $X^-$ may include a counter anion. Examples of counter anions ($X^-$) suitable for certain embodiments of the present disclosure include, but are not limited to a carboxylate, a halide, a sulfate, an organic sulfonate, a phosphonate, a hydroxide, and any combination thereof.

In certain embodiments, the anti-agglomerant hydrate inhibitor and/or hydrate inhibitor composition may include a nonionic surfactant or an anionic surfactant. In some embodiments, the anti-agglomerant hydrate inhibitor (or hydrate inhibitor composition) may include a combination of a cationic surfactant, nonionic surfactant, and/or anionic surfactant.

In some embodiments, the concentration of the anti-agglomerant hydrate inhibitor compositions (e.g., cationic surfactant) may be determined or selected as a weight percentage by weight of the aqueous phase of the fluid to which it is being introduced. In some embodiments, sufficient anti-agglomerant hydrate inhibitor is introduced into the fluid to reach a concentration of from about 0.1% to about 15% anti-agglomerant hydrate inhibitor by weight of an aqueous phase of the fluid. In certain embodiments, one or more hydrate inhibitor compositions of the present disclosure may be introduced into and/or contact the fluid in an amount from about 1% to about 15% by weight based on the weight of water in the fluid (or in other words, about 1% to about 15% by weight based on water cut).

As used herein, a "polyaromatic hydrocarbon (PAH)" refers to a hydrocarbon having a molecular structure that includes at least two aromatic rings. Examples of polyaromatic hydrocarbons suitable for certain embodiments of the present disclosure include, but are not limited to benzene, xylene, toluene, naphthalene, anthracene, pyrene, any derivative of the foregoing, and any combination thereof. In some embodiments, the polyaromatic hydrocarbons of the present disclosure may include an aromatic macromolecule. Examples of aromatic macromolecules suitable for certain embodiments of the present disclosure include, but are not limited to asphaltene, maltenes, and resins.

In certain embodiments, a polyaromatic hydrocarbon may be dissolved in a solvent. In some embodiments, solvents suitable to dissolve polyaromatic hydrocarbons include, but are not limited to cyclohexanone, tetrahydrofuran, and any combination thereof.

In some embodiments, the concentration of polyaromatic hydrocarbon may be determined or selected as a weight percentage by weight of the oil or gas phase of the fluid to which it is being introduced. In some embodiments, the polyaromatic hydrocarbon may be present in an amount from about 1% to about 30% by weight of the oil or gas phase of the fluid. In some embodiments, the polyaromatic hydrocarbon may be present in an amount of from about 1% to about 20% by weight of the oil or gas phase of the fluid. In certain embodiments, one or more polyaromatic hydrocarbons of the present disclosure may be introduced into and/or contact the fluid in an amount from about 5% to about 15% by weight of the oil or gas in the fluid.

In certain embodiments, the ratio of the concentrations of the one or more polyaromatic hydrocarbons and the anti-agglomerant hydrate inhibitor may be from about 2:1 to about 10:1 polyaromatic hydrocarbons to anti-agglomerant hydrate inhibitors by volume.

In certain embodiments, the methods of the present disclosure include applying the hydrate inhibitor composition to a fluid. In some embodiments, the method of applying the hydrate inhibitor composition to prevent hydrate plugging includes introducing an anti-agglomerant hydrate inhibitor into an umbilical line in which a fluid is located, and introducing a polyaromatic hydrocarbon into the umbilical line.

In certain embodiments, the fluids or additives may be formed at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of at least one other component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a composition of the present disclosure into a vessel, conduit (e.g., an umbilical, capillary, or tubing), wellbore, and/or a portion of a subterranean formation, the components of the composition may be mixed together prior to introduction into a vessel, conduit, well bore, and/or formation together, or one or more components may be introduced into the vessel, conduit, well bore, and/or formation separately from other components such that the components mix or intermingle in the vessel, conduit, well bore, and/or portion of the formation to form a composition. In either such case, the composition is deemed to be introduced into at least a portion of the vessel, conduit, well bore, and/or subterranean formation for purposes of the present disclosure.

In one embodiment, the method of applying the anti-agglomerant hydrate inhibitor may include coinjecting the anti-agglomerant and the polyaromatic hydrate solution at the wellhead, down a capillary line or an umbilical line. For example, in certain embodiments, the method of applying the anti-agglomerant hydrate inhibitor may include introducing the anti-agglomerant and the polyaromatic hydrate into a wellbore substantially simultaneously. In some embodiments, a method of applying chemicals to prevent hydrate plugging in the pipeline may include blending together the anti-agglomerant hydrate inhibitor together with polyaromatic hydrocarbon, then delivering the blend at the wellhead, down a capillary line or an umbilical line. In certain embodiments, the hydrate inhibitor composition, the anti-agglomerant hydrate inhibitor, and/or the polyaromatic hydrocarbon are introduced into a wellbore penetrating at least a portion of a subterranean formation. In some embodiments, the hydrate inhibitor composition includes the combination of an anti-agglomerant hydrate inhibitor and polyaromatic hydrocarbon.

The present disclosure relates to compositions and methods useful in processes involving fluid flowing through, or contained in, conduits, such as pipes used, e.g., for the production and/or transport of petroleum products, natural gas, and the like. More particularly, the present disclosure relates to additives and methods of using such additives to, for example, inhibit the formation of gas hydrate agglomerates.

In certain embodiments, the additives of the present disclosure may at least partially inhibit, retard, reduce, control, and/or delay the agglomeration of hydrates and/or hydrate-forming compounds during and/or after exposure to high temperatures. In such embodiments, the additives of the present disclosure may not substantially degrade after an extended period of time at such high temperatures. As used herein, "substantially" and variations of that term may refer to a majority of, or mostly, as in at least about 50%, 60%, 70%, 80%, 90%, 95%, 96%, 97%, 98%, 99%, 99.5%, 99.9%, 99.99%, or at least about 99.999% or more.

The present disclosure may provide a method of inhibiting the formation of hydrate agglomerates in a fluid. In certain embodiments, one or more hydrate inhibitor compositions of the present disclosure may be introduced into a fluid including any one or more of an aqueous phase (e.g., water, brine, etc.), a gas, an oil phase (e.g., one or more liquid hydrocarbons), and any combination thereof. Although listed separately from liquid hydrocarbon, the gas may in some embodiments include gaseous hydrocarbon, though the gas need not necessarily include hydrocarbon. In one embodiment, the fluid includes water with less than 120,000 ppm total dissolved solids, less than 300,000 ppm total dissolved solids, less than 500,000 ppm total dissolved solids, or less than 1,000,000 ppm total dissolved solids. In certain embodiments, the hydrate inhibitor composition may be introduced into the fluid through a conduit or an injection point. In certain embodiments, one or more hydrate inhibitor compositions of the present disclosure may be introduced into a wellbore, a conduit, a vessel, and the like and may contact and/or be introduced into a fluid residing therein. In certain embodiments, the hydrate inhibitor composition may be introduced into the fluid through an injection point in fluid communication with a wellbore.

In some embodiments, the present disclosure may also or instead provide salts of the anti-agglomerant hydrate inhibitors and/or polyaromatic hydrocarbons. For example, some embodiments provide a method of inhibiting the formation of hydrate agglomerates in a fluid including any one or more of water, gas, hydrocarbons, and combinations thereof. Such a method could include adding to the fluid an effective amount of a composition including a compound according to the present disclosure, and/or salts thereof.

In certain embodiments, the fluid to which the anti-agglomerant hydrate inhibitor and/or polyaromatic hydrocarbon is introduced may be flowing or it may be substantially stationary. The fluid may be within a vessel, or within a conduit (e.g., a conduit that may transport the fluid), or within a subterranean formation and/or a wellbore penetrating a portion of the subterranean formation. Examples of conduits include, but are not limited to, pipelines, production piping, subsea tubulars, process equipment, and the like as used in industrial settings and/or as used in the production of oil and/or gas from a subterranean formation, and the like. The conduit may in certain embodiments penetrate at least a portion of a subterranean formation, as in the case of an oil and/or gas well. In particular embodiments, the conduit may be a wellbore or may be located within a wellbore penetrating at least a portion of a subterranean formation. Such oil and/or gas well may, for example, be a subsea well (e.g., with the subterranean formation being located below the sea floor), or it may be a surface well (e.g., with the subterranean formation being located belowground). A vessel or conduit according to other embodiments may be located in an industrial setting such as a refinery (e.g., separation vessels, dehydration units, pipelines, heat exchangers, and the like), or it may be a transportation pipeline.

In some embodiments, the hydrate inhibitor compositions of the present disclosure initially may be incorporated into a treatment fluid prior to be introduced into the fluid. The treatment fluid may be any suitable fluid in which the hydrate inhibitor composition may be included. For example, in some embodiments, the treatment fluid may be suitable for use in a wellbore penetrating a subterranean formation during, for instance, oil and/or gas recovery operations. In certain embodiments, the fluid may include a solvent for the hydrate inhibitor or for a polyaromatic hydrocarbon. Solvents suitable for certain embodiments of the present disclosure include, but are not limited to xylene, methanol, isopropyl alcohol, and any combination thereof. In some embodiments, the solvent may include an alcohol or a glycol. In certain embodiments, the solvent may comprise an organic solvent. Polyaromatic hydrocarbon solvents suitable for some embodiments of the present disclosure include, but are not limited to cyclohexanone, tetrahydrofuran, and any combination thereof.

In certain embodiments, one or more hydrate inhibitor compositions of the present disclosure may be introduced to and/or contact any of various fluids having different water cuts (i.e., the ratio of the volume of water in the fluid to the total volume of the fluid). For example, in some embodiments the water cut of the fluid may be about 1 to about 65%. In other embodiments, the water cut may be as low as any one of: 1, 5, 10, 15, 20, 25, 30, 35, 40, 45, 50, 55, 60, and 65%; while the water cut may be as high as any one of: 5, 10, 15, 20, 25, 30, 35, 40, 45, 50, 55, 60, 65, 70, 75, 80, 85, 90, and 95%. In certain embodiments, a fluid may have a water cut of 5% or more, 10% or more, 15% or more, 20% or more, 30% or more, 40% or more, 50% or more, or 60% or more, up to about 99%. In yet other embodiments, one or more hydrate inhibitor compositions of the present disclosure may be introduced into or contact a fluid with any water cut ranging from about 1% to about 99%. In certain embodiments, a fluid may have a water cut of up to 50% or up to 80%.

In certain embodiments, the fluid to which one or more compositions of the present disclosure may be introduced optionally may include any number of additional additives. Examples of such additional additives include, but are not limited to, salts, surfactants, acids, proppant particulates, diverting agents, fluid loss control additives, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application. It further will be appreciated by one of ordinary skill in the art having the benefit of the present disclosure that the amount of the hydrate inhibitor compositions of the present disclosure effective for inhibiting, retarding, reducing, controlling, delaying, and/or the like hydrates may depend upon, for example, the volume of water in the fluid and/or additives in the fluid.

The methods and compositions of the present disclosure may be used during or in conjunction with any subterranean operation. Suitable subterranean operations may include, but are not limited to, preflush treatments, afterflush treatments, drilling operations, hydraulic fracturing treatments, sand control treatments (e.g., gravel packing), acidizing treatments (e.g., matrix acidizing or fracture acidizing), "frac-pack" treatments, wellbore clean-out treatments, and other operations where a treatment fluid or hydrate inhibition additive of the present disclosure may be useful. In certain embodiments, the methods and/or compositions of the present disclosure may be used in construction and/or operation of pipelines (e.g., transportation pipelines, distribution pipelines, etc.) or umbilical equipment that may be used, among other purposes, to transport various fluids (e.g., treatment fluids and/or fluids produced from subterranean formations).

In certain embodiments, the compositions of the present disclosure may be exposed to (and may remain substantially stable at) higher than ambient temperatures. For example, in some embodiments, the compositions of the present disclosure may be exposed to a temperature above about 200° F. In certain embodiments, anti-agglomerant hydrate inhibitors and polyaromatic hydrocarbons of the present disclosure may be exposed to a temperature from about 200° F. to about 400° F. In some embodiments, the anti-agglomerant hydrate inhibitors and polyaromatic hydrocarbons of the present disclosure may be exposed to a temperature from about 200° F. to about 250° F., in other embodiments, from about 250° F. to about 300° F., in other embodiments, from about 300° F. to about 350° F., and in other embodiments, from about 350° F. to about 400° F. In some embodiments, the anti-agglomerant hydrate inhibitors and polyaromatic hydrocarbons of the present disclosure may be exposed to a temperature from about 250° F. to about 275° F., in other embodiments, from 275° F. to about 300° F., in other embodiments, from about 300° F. to about 325° F., and in other embodiments from about 325° F. to about 350° F.

In certain embodiments, the anti-agglomerant hydrate inhibitors and polyaromatic hydrocarbons of the present disclosure may be exposed to a temperature of above about 200° F. when introduced into or contacting a fluid having a temperature of above about 200° F. In such embodiments, the fluid may have a temperature from about 200° F. to about 400° F. In some embodiments, the fluid may have a temperature from about 250° F. to about 350° F. In certain embodiments, the anti-agglomerant hydrate inhibitors and polyaromatic hydrocarbons may be exposed to a temperature above about 200° F. in a conduit, an injection point, an umbilical, a wellbore, and the like having a temperature above about 200° F. through which the anti-agglomerant hydrate inhibitors and polyaromatic hydrocarbons travel when being introduced into or contacting the fluid.

In certain embodiments, the anti-agglomerant hydrate inhibitors and polyaromatic hydrocarbons of the present disclosure may be exposed to lower than ambient temperatures. For example, in some embodiments, when introduced into an umbilical, the anti-agglomerant hydrate inhibitors and polyaromatic hydrocarbons of the present disclosure may be exposed to ambient temperatures or temperatures at or above about 100° F.

In certain embodiments, the anti-agglomerant hydrate inhibitors and polyaromatic hydrocarbons of the present disclosure may be introduced into a wellbore, subterranean formation, vessel, and/or conduit (and/or into a fluid within any of the foregoing) using any method or equipment known in the art. For example, the anti-agglomerant hydrate inhibitors and polyaromatic hydrocarbons of the present disclosure may be applied to a subterranean formation and/or wellbore using batch treatments, squeeze treatments, continuous treatments, and/or any combination thereof. In certain embodiments, a batch treatment may be performed in a subterranean formation by stopping production from the well and pumping the dissolved hydrate inhibitors into a wellbore, which may be performed at one or more points in time during the life of a well. In other embodiments, a squeeze treatment may be performed by dissolving the anti-agglomerant hydrate inhibitors or polyaromatic hydrocarbons of the present disclosure in suitable solvents at suitable concentrations and squeezing the solvent carrying the additives into the formation, allowing production out of the formation to bring the anti-agglomerant hydrate inhibitors and polyaromatic hydrocarbons to the desired location. In other embodiments, the anti-agglomerant hydrate inhibitors and polyaromatic hydrocarbons of the present disclosure may be injected into a portion of a subterranean formation using an annular space or capillary injection system to continuously introduce the additives into the formation. In certain embodiments, a composition including the anti-agglomerant hydrate inhibitors and polyaromatic hydrocarbons of the present disclosure may be circulated in the wellbore using the same types of pumping systems and equipment at the surface that are used to introduce treatment fluids or additives into a wellbore penetrating at least a portion of the subterranean formation.

For example, a polyaromatic hydrocarbon hydrate inhibitor composition of the present disclosure (e.g., a fluid including an anti-agglomerant hydrate inhibitor and a polyaromatic hydrocarbon) may be introduced into a wellbore and/or tubing using a capillary injection system as shown in FIG. 1. Referring now to FIG. 1, wellbore 405 has been drilled to penetrate a portion of a subterranean formation 400. A tubing 410 (e.g., production tubing) has been placed in the wellbore 405. A capillary injection tube 430 is disposed in the annular space between the outer surface of tubing 410 and the inner wall of wellbore 405. The capillary injection tube 430 is connected to a side-pocket mandrel 440 at a lower section of the tubing 410. The anti-agglomerant hydrate inhibitors and/or polyaromatic hydrocarbons of the present disclosure may be injected into capillary injection tube 430 at the wellhead 408 at the surface such that it mixes with production fluid at or near the side-pocket mandrel 440. As the production fluid flows through the tubing 410, the hydrate inhibitor composition may prevent, inhibit, retard, reduce, control, and/or delay the formation of one or more hydrates within the tubing 410. Other capillary injection systems and side pocket mandrel devices (e.g., those used in gas lift production) may be used in a similar manner to the system shown in FIG. 1.

In certain embodiments, the anti-agglomerant hydrate inhibitors and polyaromatic hydrocarbons of the present disclosure may be added to a conduit such as a pipeline where one or more fluids enter the conduit and/or at one or more other locations along the length of the conduit. In such embodiments, the anti-agglomerant hydrate inhibitors and polyaromatic hydrocarbons may be added in batches or injected substantially continuously while the pipeline is being used.

Once introduced into a fluid, subterranean formation, wellbore, pipeline, or other location, the anti-agglomerant hydrate inhibitors and polyaromatic hydrocarbons of the present disclosure may inhibit, retard, reduce, control, and/or delay the formation of one or more hydrates or the agglomeration of hydrate crystals within the fluid, subterranean formation, wellbore, pipeline, or other location.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Rocking cell tests were carried out on numerous samples of different compounds having structures according to some embodiments of the present disclosure. The rocking cell tests involved the injection of oil, water, and LDHI compound into a cell at representative conditions. Gas was injected into the cell to reach the desired working pressure. Each cell had a fixed volume and contained constant mass during the experiment; that is, oil, water, LDHI compound, and (in some cases) gas were injected at the beginning of the experiment, but thereafter the cell was closed to mass transfer in or out of the cell. Each cell also included a magnetic ball in the space where fluids are injected. The ball aided in agitation of the fluids during rocking. Magnetic sensors on both ends of the cell detected whether the magnetic ball's movements through the fluids were hindered during rocking, thereby indicating the presence of hydrates. The cell also permitted visual observation of its contents for formation of hydrates during the experiment.

The oil used for these tests was dodecane and the water phase was a 3.5% by weight NaCl brine. The oil was pre-conditioned by heating and shaking at 70° C. for 1 hour. The proper amount of oil, water and inhibitor were injected into the cells per the values listed in Tables 2-4 below. Thereafter, the cells were pressurized to 2,000 psi with Green Canyon gas, a common Gulf of Mexico Type II hydrate former. The composition of Green Canyon gas, used for this study, is provided in Table 1.

TABLE 1

Composition of Green Canyon Gas

| Composition | Mole % |
|---|---|
| N2 | 0.39 |
| nC1 | 87.26 |
| nC2 | 7.57 |
| nC3 | 3.10 |
| iC4 | 0.49 |
| nC4 | 0.79 |
| iC5 | 0.20 |
| nC5 | 0.20 |

During the initial phase of each test, the cells were rocked at the prescribed angle and rate for a period of 2 hours in order to sufficiently emulsify the fluids and saturate the liquid phase with gas such that no further gas would be consumed by the liquid phase. Thereafter, the gas inlet valves were closed and the temperature was ramped down from 20° C. to 4° C. over 2 hours. After reaching the designated temperature, the cells were rocked at 15 cycles per minute and at an incline of 25° was continued for around 18 hours. Thereafter, the motor was programmed to stop for 6 hours with the cells horizontal to simulate a system shut in. The shut-in period lasted for at least 6 hours, varying only so that the restart could be visually observed. Observations were made throughout the tests. Particular attention was paid to hydrate formation during the period before shut-in and the restart.

The performance of each anti-agglomerant hydrate inhibitor was ranked as a "Pass" or a "Fail" based on visual observation and sensor data. When hydrate blockages impeded the motion of the ball, the cell was ranked as a "Fail." If a cell visually passed, the sensors must also have shown no obstruction or hindrance to the movement of the ball for the cell to rank as a "Pass." For cells that passed, it was noted whether there was any deposition of observable hydrate particles in the cell.

The following 15 rocking cell tests were designed to evaluate the impact of the addition of polyaromatic hydrocarbons on anti-agglomerant hydrate inhibitor performance.

Results are listed below for each round of testing. As referenced below, MC 218-78-01 is a two-tailed cationic surfactant of the molecular structure described above. Aromatic volume is the solution of polyaromatic hydrocarbon in cyclohexanone at 17% concentration by weight.

Example 1

As shown in Table 2, the MC 218-78-01 anti-agglomerant hydrate inhibitor combined with a polyaromatic hydrocarbon additive such as pyrene, naphthalene and xylene showed better performance compared to the hydrate inhibitor without a polyaromatic hydrocarbon additive. The particle size after hydrate formation in cells with an anti-agglomerant hydrate inhibitor and a polyaromatic hydrocarbon additive was larger than cell 200 with an anti-agglomerant and no polyaromatic hydrocarbon additive. Cell 200 had deposits at the bottom of the tubes. Cell 205 having pyrene but no anti-agglomerant hydrate inhibitor resulted in a hydrate plug.

TABLE 2

| Cell ID | Oil Cut (Vol %) | Polyaromatic Hydrocarbon (PAH) Type | PAH (Vol %) | Hydrate Inhibitor Name | Dosage (Vol %) | Oil Vol (mL) | Water Vol (mL) | Aromatic Vol (mL) | Hydrate Inhibitor Vol (µL) | Pass/Fail |
|---|---|---|---|---|---|---|---|---|---|---|
| 200 | 70.0% | | | MC 218-78-01 | 2.00% | 8.400 | 3.600 | | 72.0 | Pass* |
| 201 | 65.1% | naphthalene | 20% | MC 218-78-01 | 2.00% | 6.719 | 3.602 | 1.680 | 72.0 | Pass# |
| 202 | 67.7% | pyrene | 10% | MC 218-78-01 | 2.00% | 7.556 | 3.605 | 0.840 | 72.1 | Pass# |
| 203 | 65.1% | xylene | 20% | MC 218-78-01 | 2.00% | 6.719 | 3.602 | 1.680 | 72.0 | Pass# |
| 204 | 65.1% | naphthalene | 20% | | | 6.719 | 3.602 | 1.680 | 0.0 | Fail |
| 205 | 67.7% | pyrene | 10% | | | 7.556 | 3.605 | 0.840 | 0.0 | Fail |

*indicates deposition in cell
indicates large observable hydrate particles.

Example 2

As shown in Table 3, the MC 218-78-01 anti-agglomerant hydrate inhibitor combined with pyrene showed better performance compared to MC 218-78-01 without such an additive. Cell 302 confirmed that adding pyrene to the anti-agglomerant hydrate inhibitor results in a synergistic effect. The particle size after hydrate formation in cells with an anti-agglomerant and pyrene was larger than cell 300 with anti-agglomerant and no polyaromatic hydrocarbon additive. Cell 300 had deposits at the bottom of the sapphire tubes. Cell 305 having no anti-agglomerant hydrate inhibitor was plugged after hydrate onset.

TABLE 3

| Cell ID | Oil Cut (Vol %) | Polyaromatic Hydrocarbon (PAH) Type | PAH (Vol %) | Hydrate Inhibitor Name | Dosage (Vol %) | Oil Vol (mL) | Water Vol (mL) | Aromatic Vol (mL) | Hydrate Inhibitor Vol (µL) | Pass/Fail |
|---|---|---|---|---|---|---|---|---|---|---|
| 300 | 65.00% | | | MC 218-78-01 | 2.00% | 7.800 | 4.200 | | 84.0 | Pass* |
| 302 | 59.77% | pyrene | 20% | MC 218-78-01 | 2.00% | 6.240 | 4.200 | 1.560 | 84.0 | Pass# |
| 305 | 48.15% | pyrene | 50% | | | 3.900 | 4.200 | 3.900 | 0.0 | Fail |

*indicates deposition in cell
indicates large hydrate particles.

Example 3

As shown in Table 4, the MC 218-78-01 anti-agglomerant hydrate inhibitor combined with a polyaromatic hydrocarbon such as pyrene showed better anti-agglomerant performance compared to MC 218-78-01 without such an additive. There were observable particles after hydrate formation in cells 103 and 104 (anti-agglomerant hydrate inhibitor and pyrene) were observable but the particles appeared to be dispersed in the oil phase. Cell 100 (hydrate inhibitor without polyaromatic hydrocarbons) had deposits at the bottom of the sapphire tubes. Cell 101 (hydrate inhibitor without polyaromatic hydrocarbon) was completely plugged with hydrates. The anti-agglomerant hydrate inhibitor combined with pyrene resulted in flowable hydrate slurries. These results demonstrate that the hydrate inhibition of the cells with an anti-agglomerant hydrate inhibitor and a polyaromatic hydrocarbon is enhanced compared to the cells with just an anti-agglomerant hydrate inhibitor and no polyaromatic hydrocarbon. In the cells with just the anti-agglomerant present, the particle size was smaller after hydrate onset but there was deposition at the bottom of the cells.

TABLE 4

| Cell ID | Oil Cut (Vol %) | Polyaromatic Hydrocarbon (PAH) Type | PAH (Vol %) | Hydrate Inhibitor Name | Dosage (Vol %) | Oil Vol (mL) | Water Vol (mL) | Aromatic Vol (mL) | Hydrate Inhibitor Vol (µL) | Pass/Fail |
|---|---|---|---|---|---|---|---|---|---|---|
| 100 | 60.00% | | | MC 218-78-01 | 2.00% | 7.200 | 4.800 | | 96.0 | Fail* |
| 101 | 65.00% | | | MC 218-78-01 | 1.50% | 7.800 | 4.200 | | 63.0 | Fail* |
| 102 | 50.00% | | | MC 218-78-01 | 2.00% | 6.000 | 6.000 | | 120.0 | Fail |
| 103 | 54.55% | pyrene | 20% | MC 218-78-01 | 2.00% | 5.760 | 4.799 | 1.440 | 96.0 | Pass# |
| 104 | 59.77% | pyrene | 20% | MC 218-78-01 | 1.50% | 6.240 | 4.200 | 1.560 | 63.0 | Pass# |
| 105 | 65.00% | | | Cyclohexanone | 1.70% | 7.800 | 4.200 | | 71.4 | Fail |

*indicates deposition in cell
indicates large observable hydrate particles.

In summary, these tests demonstrate that the addition of polyaromatic hydrocarbons (e.g., xylene, naphthalene, or pyrenes) enhances anti-agglomerant hydrate inhibitor performance. In tests where a particular dosage of anti-agglomerant hydrate inhibitor resulted in a "fail" rocking cell test result, the addition of polyaromatic hydrocarbons yielded a passing result. These tests also suggest that the synergistic impact of pyrenes is greater than that of naphthalene, and the synergistic effect of naphthalene is greater than xylene.

An embodiment of the present disclosure includes introducing a hydrate inhibitor composition including an anti-agglomerant hydrate inhibitor into a fluid including (i) water and (ii) one of gas, liquid hydrocarbon, and any combination thereof; and introducing a polyaromatic hydrocarbon into the fluid.

In one or more embodiments described above, the anti-agglomerant hydrate inhibitor includes a cationic surfactant with at least one hydrophilic head and at least one lipophilic tail. In one or more embodiments described above, the anti-agglomerant hydrate inhibitor includes a two-tailed cationic surfactant. In one or more embodiments described above, the anti-agglomerant hydrate inhibitor includes at least one compound having the structural formula:

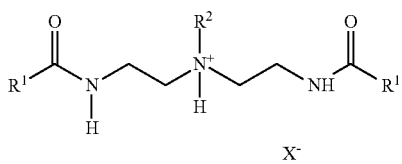

where $R^1$ is $C_5$-$C_{22}$, $R^2$ is $C_1$-$C_6$ and $X^-$ is a counter anion. In one or more embodiments described above, the fluid resides within a location selected from the group consisting of: a conduit, a wellbore, a subterranean formation, and a vessel. In one or more embodiments described above, the hydrate inhibitor composition is introduced into a conduit through which the fluid is flowing. In one or more embodiments described above, X— is selected from the group consisting of: a carboxylate, a halide, a sulfate, an organic sulfonate, a phosphonate, a hydroxide, and any combination thereof. In one or more embodiments described above, the polyaromatic hydrocarbon is selected from the group consisting of: benzene, xylene, toluene, naphthalene, anthracene, pyrene, and any combination thereof. In one or more embodiments described above, after the step of allowing the hydrate inhibitor composition to contact the fluid, the anti-agglomerant hydrate inhibitor is present in an amount of from about 0.1% to about 15% by weight of an aqueous phase of the fluid. In one or more embodiments described above, the fluid includes water and has a water cut of up to 80%. In one or more embodiments described above, the fluid includes less than 500,000 ppm total dissolved solids. In one or more embodiments described above, after the steps of allowing the hydrate inhibitor composition and the polyaromatic hydrocarbon to contact the fluid, wherein the polyaromatic hydrocarbon and the anti-agglomerant hydrate inhibitor are present in concentrations having a ratio of from about 2:1 to about 10:1 by volume. In one or more embodiments described above, the fluid includes an oil phase and the polyaromatic hydrocarbon is present in an amount of from about 1% to about 30% by weight of the oil phase. In one or more embodiments described above, the hydrate inhibitor composition further includes a nonionic surfactant or an anionic surfactant. In one or more embodiments described above, the hydrate inhibitor composition and the polyaromatic hydrocarbon are introduced into the fluid substantially simultaneously.

In another embodiment, the methods of the present disclosure include forming a hydrate inhibitor composition by mixing an anti-agglomerant hydrate inhibitor with a polyaromatic hydrocarbon, wherein the polyaromatic hydrocarbon and the anti-agglomerant hydrate inhibitor are present in concentrations having a ratio of from about 2:1 to about 10:1 by volume; and injecting the hydrate inhibitor composition into an umbilical. In one or more embodiments described above, the polyaromatic hydrocarbon includes a solvent selected from the group consisting of: cyclohexanone, tetrahydrofuran, and any combination thereof.

In another embodiment, the methods of the present disclosure include introducing a hydrate inhibitor composition including an anti-agglomerant hydrate inhibitor into a wellhead of a wellbore penetrating at least a portion of a subterranean formation; and introducing a polyaromatic hydrocarbon into the wellhead. In one or more embodiments described above, after the step of introducing the polyaromatic hydrocarbon into the fluid, the polyaromatic hydrocarbon and the anti-agglomerant hydrate inhibitor are present in concentrations having a ratio of from about 2:1 to about 10:1 by volume. In one or more embodiments described above, the method further includes allowing the hydrate inhibitor composition to contact a fluid residing in the wellbore.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a hydrate inhibitor composition comprising an anti-agglomerant hydrate inhibitor into a fluid comprising (i) water and (ii) one of gas, liquid hydrocarbon, and any combination thereof, wherein the anti-agglomerant hydrate inhibitor comprises at least one compound having the structural formula:

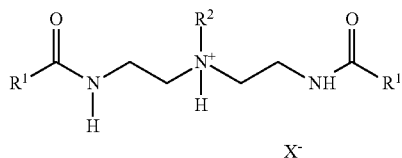

where $R^1$ is $C_5$-$C_{22}$, $R^2$ is $C_1$-$C_6$ and $X^-$ is a counter anion; and introducing a polyaromatic hydrocarbon into the fluid.

2. The method of claim 1, wherein X— is selected from the group consisting of: a carboxylate, a halide, a sulfate, an organic sulfonate, a phosphonate, a hydroxide, and any combination thereof.

3. The method of claim 1 wherein the fluid resides within a location selected from the group consisting of: a conduit, a wellbore, a subterranean formation, and a vessel.

4. The method of claim 1, wherein the hydrate inhibitor composition is introduced into a conduit through which the fluid is flowing.

5. The method of claim 1, wherein the polyaromatic hydrocarbon is selected from the group consisting of: benzene, xylene, toluene, naphthalene, anthracene, pyrene, and any combination thereof.

6. The method of claim 1, wherein sufficient anti-agglomerant hydrate inhibitor is introduced into the fluid to reach a concentration of from about 0.1% to about 15% anti-agglomerant hydrate inhibitor by weight of an aqueous phase of the fluid.

7. The method of claim 1, wherein the fluid comprises water and has a water cut of up to 80%.

8. The method of claim 1, wherein the fluid comprises less than 500,000 ppm total dissolved solids.

9. The method of claim 1, wherein after the step of introducing the polyaromatic hydrocarbon into the fluid, the polyaromatic hydrocarbon and the anti-agglomerant hydrate inhibitor are present in concentrations having a ratio of from about 2:1 to about 10:1 by volume.

10. The method of claim 1, wherein the fluid comprises an oil phase and the polyaromatic hydrocarbon is present in an amount of from about 1% to about 30% by weight of the oil phase.

11. The method of claim 1, wherein the hydrate inhibitor composition further comprises a nonionic surfactant or an anionic surfactant.

12. The method of claim 1, wherein the hydrate inhibitor composition and the polyaromatic hydrocarbon are introduced into the fluid substantially simultaneously.

13. A method comprising:

forming a hydrate inhibitor composition by mixing an anti-agglomerant hydrate inhibitor with a polyaromatic hydrocarbon, wherein the polyaromatic hydrocarbon and the anti-agglomerant hydrate inhibitor are present in concentrations having a ratio of from about 2:1 to about 10:1 by volume; and injecting the hydrate inhibitor composition into a subsea umbilical.

14. The method of claim 13, wherein the polyaromatic hydrocarbon comprises a solvent selected from the group consisting of: cyclohexanone, tetrahydrofuran, and any combination thereof.

15. A method comprising:

introducing a hydrate inhibitor composition comprising an anti-agglomerant hydrate inhibitor and at least one of a nonionic surfactant or an anionic surfactant into a fluid comprising (i) water and (ii) one of gas, liquid hydrocarbon, and any combination thereof; and introducing a polyaromatic hydrocarbon into the fluid.

16. The method of claim 15 wherein the fluid resides within a location selected from the group consisting of: a conduit, a wellbore, a subterranean formation, and a vessel.

17. The method of claim 15, wherein the hydrate inhibitor composition is introduced into a conduit through which the fluid is flowing.

18. The method of claim 15, wherein the polyaromatic hydrocarbon is selected from the group consisting of: benzene, xylene, toluene, naphthalene, anthracene, pyrene, and any combination thereof.

19. The method of claim 15, wherein sufficient anti-agglomerant hydrate inhibitor is introduced into the fluid to reach a concentration of from about 0.1% to about 15% anti-agglomerant hydrate inhibitor by weight of an aqueous phase of the fluid.

20. The method of claim 15, wherein the fluid comprises water and has a water cut of up to 80%.

* * * * *